Jan. 8, 1952    LE EMMETTE V. DE FEE    2,582,109
ASH TRAY

Filed Nov. 22, 1948    2 SHEETS—SHEET 1

Inventor
LE EMMETTE V. de FEE

By
Attorney

Jan. 8, 1952                LE EMMETTE V. DE FEE                2,582,109
                                   ASH TRAY
Filed Nov. 22, 1948                                          2 SHEETS—SHEET 2

Inventor
LE EMMETTE V. de FEE

By
Attorney

Patented Jan. 8, 1952

2,582,109

UNITED STATES PATENT OFFICE 2,582,109

ASH TRAY

Le Emmette V. de Fee, St. Paul, Minn., assignor to Brown & Bigelow, St. Paul, Minn., a corporation of Minnesota Application November 22, 1948, Serial No. 61,423

3 Claims. (Cl. 220—20.5)

My invention relates to an improvement in ash trays.

It is an object of my invention to provide a receptacle in which ashes are deposited and concealed therein.

It is the primary object of my invention to provide an ash receiving plate which forms the bottom of an ash receiving recess, which plate may be actuated to open a hole formed in the bottom of the ash receiving recess by means of my new mechanical construction.

Another feature resides in providing a means for automatically cleaning the surface of the ash receiving plate which forms the moveable bottom of the ash receiving recess.

It is an additional feature to provide mechanism for actuating the ash receiving shutter plate which is over and well above the center of the ash receiving bowl. I also provide a simple support for the moveable ash receiving plate.

It is a feature to provide a single shutter plate operating to close the opening of the ash tray by a spring, the plate being formed of a single flat sheet, one end of which extends to and is connected with an operating rod positioned to one side of the opening.

The plate-like shutter is adapted to be supported from below by a guide plate which is formed with a hole which coincides with the ash receiving hole formed in the top of the ash tray.

The movement of the shutter plate is governed by a lug struck from the body of the shutter plate which lug operates in an arcuated slot formed in the supporting guide plate.

A further object is to provide an ash tray shutter of extremely simple construction and wherein a lug struck from the shutter plate and another lug struck from the guide plate form the means of connecting a coil spring to the shutter and to the fixed guide plate which provides spring means for holding the shutter plate in closed position.

These objects, together with other details and objects, will be more thoroughly hereinafter set forth in the following specification and claims.

Figure 1:
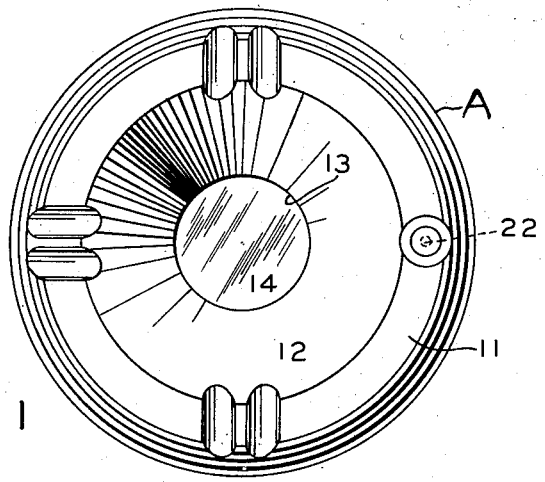
Figure 1 is a plan view of my device.

My ash tray A includes a lower bowl or ash receptacle 10 upon which is tightly positioned the upper cover portion 11. The upper cover portion 11 has formed centrally thereof the ash receiving recess 12 which is generally frustro conical in shape. The form or shape of the recess 12 may vary, but the bottom of the recess 12 is formed with an opening such as 13. The opening 13 leads to the bowl portion 10.

The opening 13 is closed by the ash receiving shutter plate 14 when not in use. The plate 14 is supported directly below the opening 13 and in contact with the bottom edge thereof when in a closed position. The single shutter plate 14 is supported by means of the supporting guide plate member 15 which has formed in the enlarged end thereof the hole 16 which has substantially the same diameter as the hole 13 formed in the bottom of the recess 12.

The guide support member 15 is supported directly beneath and in contact with the plate 14 by means of the screws 17 which are secured into the lugs 18 formed on the under side of the recess 12. The plate 14 is thereby kept in slideable contact with the under edge of the opening 13. The small end portion 19 of the plate 14 has a rectangular slot 20 formed therein adapted to receive the flattened rectangular lower end 21 of the rod 22. The rectangular end 21 of the rod 22 protrudes through and rotates within a hole formed in the small end 23 of the support member 15 and has a nut 24 secured to the lower end thereof. Thus, the rod 22 when supported in a portion of the top cover 11, will pivotally move the ash receiving shutter plate 14 above the hole 16 which as hereinbefore stated is positioned directly below the opening 13. The ear or lug 25 is formed in the upper surface of the plate 14. The ear 26 is formed in the upper surface of the support member 15. A spring 27 connects with both the ears, 25 and 26, tending to maintain the plate 14 in a closed position over the hole 16 and directly beneath the opening 13.

The ear or lug 28 is formed on the under side of the plate 14 and adapted to engage the shoulder 29 which is formed on the end of the arcuated slot 30 in such a position that the plate 14 is held in a position to cover the opening 13 with the action of the spring 27. When the plate 14 is rotated so that the opening 13 is free of plate 14, the ear 28 engages the shoulder 31 which is positioned so that the plate 14 will fully open and move no further against the action of the spring 27.

Figure 2:
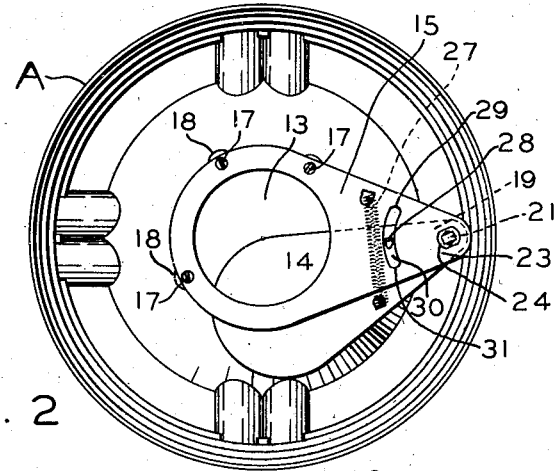
Figure 2 is a view of the under side of the removable top portion of my ash tray showing the moveable ash receiving plate and support therefor.
Figure 3:
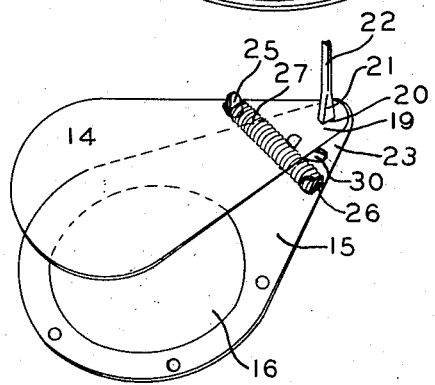
Figure 3 is a perspective view of the moveable plate and support mechanism removed from the cover.
Figure 4:
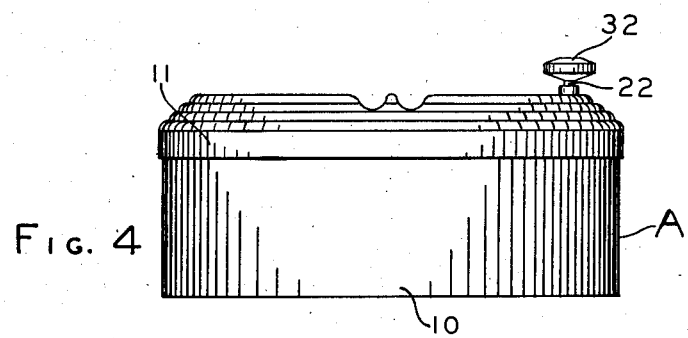
Figure 4 is a side elevational view of the ash tray.

The ash receiving plate 14 is maintained in contact with the edge of the opening 13 by means of the support 15. As a result of this positioning of the plate 14, the upper surface of the plate 14 is scraped free of ashes, etc. by means of the edge of the opening 13 when the plate is moved from the closed position to the partially open position shown in Figure 2.

The rod 22 is actuated by the knob 32 which is secured thereto.

I also provide an alternative form of my ash tray B which comprises the ash receiving bowl 33 which is similar to the bowl 10, together with the top cover portion 34 which is similar to the top cover portion 11. The form B is also provided with an ash receiving recess 35, identical with recess 12. In the form B the single ash receiving shutter plate 36 is supported directly beneath and in contact with the lower edge 35' which defines the opening 36' of the recess 35 on one end in a slot 37 formed in the lug 38. The ash receiving plate 36 is further supported by means of the rod member 39 which is secured on one end to the lug 40 formed on the under side of the recess 35.

Figure 5:
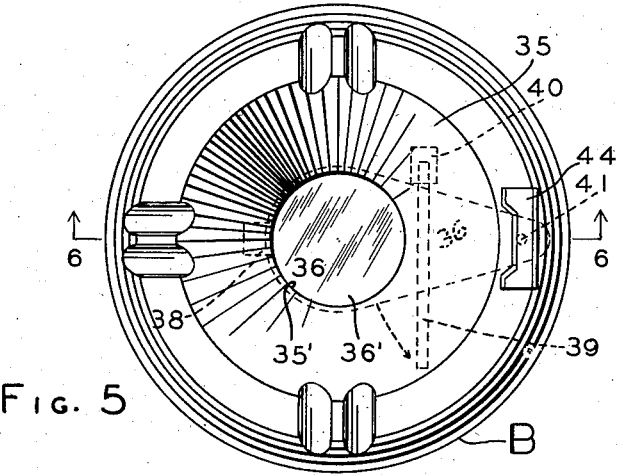
Figure 5 is a plan view of an alternative form of my ash tray.
Figure 6:
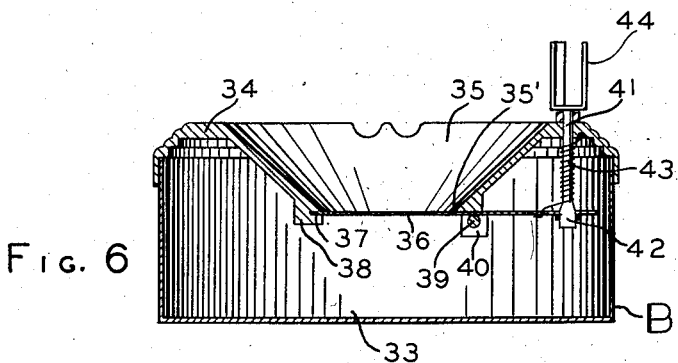
Figure 6 is a section on the line 6—6 of Figure 5.

The shutter plate 36 is pivotally actuated to clear the opening 36' by means of the rod 41 which has the squared end 42 formed on the lower end thereof and which engages a slot formed in the small end of the plate 36. The spring 43 maintains the plate 36 in the closed position shown in the Figure 5 against the edge of the lug 40. The plate 36 is moved in the direction of the arrow found in Figure 5 by means of the member 44 which is secured to the upper end of the rod 41. The lower edge 35' scrapes the upper flat surface of the plate 36 clean of matter as the plate 36 is moved in the direction of the arrow indicated in Figure 5 to a position where the plate is no longer visible. Thus, the plates 36 and 14 are self cleansing on the hole edge of the recesses 35 and 12 respectively.

The placement of the springs 27 and 43 provides positive dumping and scraping of the plates 14 and 36 together with positive returning action of the abovementioned plate members.

I claim:

1. An ash tray having a depressed ash receiving opening, a pear-shaped ash receiving plate, a slot formed in the small end of said plate, a lug struck from said ash receiving plate, a support plate for said ash receiving plate adapted to support said ash plate in contact with the lower edge of said ash receiving opening and having an opening formed therein substantially the size of said ash receiving opening, a rod positioned in said slot formed in said ash receiving plate and pivotally secured to said support plate for actuating said ash plate, a lug struck from said support plate, spring means connecting said lugs to urge said ash receiving plate beneath said ash receiving opening.

2. An ash tray having an ash receiving opening, a single piece ash receiving plate, a support plate for said ash plate having an opening formed therein, a rod extending through and secured to one end of said ash receiving plate and pivotally secured to one end of said support plate, spring means connecting said ash plate and said support plate, means securing said support plate beneath said ash receiving plate and said opening to cause said ash receiving plate to contact the edge of said ash receiving opening whereby when said rod is rotated, said ash receiving plate is scraped clean by the edge of said ash receiving opening.

3. A unit cover and closure for an ash tray including a frusto conical depression in said cover, said cover having a hole formed in the bottom of said depression, a one piece pear-shaped valve having a flat upper surface adapted to ride against the lower edge of said hole on which ashes are adapted to be dropped, a similar shaped guide plate having an opening formed therein and positioned below said valve plate, srping means for normally holding said valve plate closed, and a rod for sliding said valve plate away from said opening in said cover scraping the ashes off of said valve plate by the lower edge of the opening of said cover.

LE EMMETTE V. DE FEE.

REFERENCES CITED

The following references are of record in the file of this patent:

UNITED STATES PATENTS

| Number | Name | Date |
|---|---|---|
| 1,910,988 | Grunwald | May 23, 1933 |
| 2,059,105 | Heisenfeldt | Oct. 27, 1936 |
| 2,102,565 | Booth | Dec. 14, 1937 |
| 2,311,568 | Parkinson | Feb. 16, 1943 |

FOREIGN PATENTS

| Number | Country | Date |
|---|---|---|
| 4,848 | Great Britain | 1898 |